United States Patent
Tian et al.

(10) Patent No.: US 12,159,627 B2
(45) Date of Patent: Dec. 3, 2024

(54) IMPROVING CUSTOM KEYWORD SPOTTING SYSTEM ACCURACY WITH TEXT-TO-SPEECH-BASED DATA AUGMENTATION

(71) Applicant: Microsoft Technology Licensing, LLC, Redmond, WA (US)

(72) Inventors: Yao Tian, Redmond, WA (US); Yuija Xiao, Redmond, WA (US); Edward Lin, Redmond, WA (US); Lei He, Redmond, WA (US); Hui Zhu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 339 days.

(21) Appl. No.: 17/626,629

(22) PCT Filed: Jun. 12, 2020

(86) PCT No.: PCT/US2020/037339
§ 371 (c)(1),
(2) Date: Jan. 12, 2022

(87) PCT Pub. No.: WO2021/040842
PCT Pub. Date: Mar. 4, 2021

(65) Prior Publication Data
US 2022/0262352 A1    Aug. 18, 2022

(30) Foreign Application Priority Data
Aug. 23, 2019  (CN) .......................... 201910783303.8

(51) Int. Cl.
*G10L 15/16*    (2006.01)
*G06F 40/166*    (2020.01)
(Continued)

(52) U.S. Cl.
CPC ........ *G10L 15/1815* (2013.01); *G06F 40/166* (2020.01); *G06F 40/279* (2020.01);
(Continued)

(58) Field of Classification Search
None
See application file for complete search history.

(56) References Cited

U.S. PATENT DOCUMENTS 7,275,033 B1    9/2007  Zhao et al.
10,210,861 B1 *  2/2019  Arel ........................ G10L 13/00
(Continued)

FOREIGN PATENT DOCUMENTS

CN    101196904 A    6/2008
CN    103186607 A    7/2013
(Continued)

OTHER PUBLICATIONS

Rygaard, Luise Valentin. "Using synthesized speech to improve speech recognition for lowresource languages." vol. 8 (2015) (Year: 2018).*
(Continued)

*Primary Examiner* — Seong-Ah A Shin
(74) *Attorney, Agent, or Firm* — Schwegman Lundberg & Woessner, P.A.

(57) ABSTRACT

The present disclosure provides methods and apparatus for optimizing a keyword spotting system. A set of utterance texts including a given keyword may be generated. A set of speech signals corresponding to the set of utterance texts may be synthesized. An acoustic model in the keyword spotting system may be optimized with at least a part of speech signals in the set of speech signals and utterance texts in the set of utterance texts corresponding to the at least a part of speech signals.

14 Claims, 9 Drawing Sheets

(51) Int. Cl.

| | |
|---|---|
| *G06F 40/279* | (2020.01) |
| *G06F 40/30* | (2020.01) |
| *G10L 13/02* | (2013.01) |
| *G10L 15/18* | (2013.01) |
| *G10L 15/22* | (2006.01) |
| *G10L 15/08* | (2006.01) |

(52) U.S. Cl.
CPC .............. *G06F 40/30* (2020.01); *G10L 13/02* (2013.01); *G10L 15/22* (2013.01); *G10L 2015/081* (2013.01); *G10L 2015/088* (2013.01)

(56) References Cited

U.S. PATENT DOCUMENTS

| | | | |
|---|---|---|---|
| 10,937,444 B1* | 3/2021 | Suendermann-Oeft | ................... G06N 3/045 |
| 2017/0236511 A1* | 8/2017 | Zhao | ................ G10L 15/19 704/240 |
| 2018/0197533 A1* | 7/2018 | Lyon | ................ G10L 15/02 |
| 2019/0287515 A1* | 9/2019 | Li | ................ G06N 3/084 |
| 2020/0026760 A1* | 1/2020 | Chiu | ................ G06F 40/20 |
| 2021/0304769 A1* | 9/2021 | Ye | ................ G10L 15/16 |

FOREIGN PATENT DOCUMENTS

| | | |
|---|---|---|
| CN | 103956166 A | 7/2014 |
| CN | 109712612 A | 5/2019 |
| JP | 2007004831 A | 1/2007 |
| JP | 2018010610 A | 1/2018 |

OTHER PUBLICATIONS

Office Action received for European Application No. 20736492.8, mailed on Nov. 29, 2023, 9 Pages.

"First Office Action and Search Report Issued in Chinese Patent Application No. 201910783303.8", Mailed Date: Aug. 19, 2023, 11 Pages.

Brown, et al., "Class-Based n-gram Models of Natural Language", In Journal of Computational Linguistics, vol. 18, No. 4, Dec. 1992, pp. 467-480.

"International Search Report and Written Opinion Issued in PCT Application No. PCT/US20/037339", Mailed Date: Sep. 23, 2020, 12 Pages.

Rygaard, Luise V., "Using Synthesized Speech to Improve Speech Recognition for Low-Resource Languages", Retrieved from: http://dreuarchive.cra.org/2015/Rygaard/report.pdf, 2015, 6 Pages.

"Office Action Issued in European Patent Application No. 20736492.8", Mailed Date: Jul. 27, 2023, 4 Pages.

Office Action Received for Chinese Application No. 201910783303.8, mailed on Mar. 25, 2024, 8 pages (English Translation Provided).

"Notice of Allowance Issued in European Patent Application No. 20736492.8", Mailed Date: Sep. 25, 2023, 8 Pages.

Decision to grant a European patent pursuant to Article 97(1) EPC received for European Application No. 20736492.8, mailed on Apr. 5, 2024, 2 Pages.

\* cited by examiner

IMPROVING CUSTOM KEYWORD SPOTTING SYSTEM ACCURACY WITH TEXT-TO-SPEECH-BASED DATA AUGMENTATION

CROSS-REFERENCE TO RELATED APPLICATIONS

This application is a U.S. National Stage Filing under 35 U.S.C. 371 of International Patent Application Serial No. PCT/US2020/037339, filed Jun. 12, 2020, and published as WO/2021/040842 on Mar. 4, 2021, which application and publication are incorporated herein by reference in their entirety.

BACKGROUND

Speech recognition may be used to recognize, from input speech signals, textual sequences corresponding to the input speech signals. Speech-based keyword spotting (KWS) or keyword recognition is a subtask of speech recognition. Keyword spotting does not need to spot or recognize each word from speech signals, but only needs to spot or recognize a given keyword from the speech signals.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure provide methods and apparatus for optimizing a keyword spotting system. A set of utterance texts including a given keyword may be generated. A set of speech signals corresponding to the set of utterance texts may be synthesized. An acoustic model in the keyword spotting system may be optimized with at least a part of speech signals in the set of speech signals and utterance texts in the set of utterance texts corresponding to the at least a part of speech signals.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and the present disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
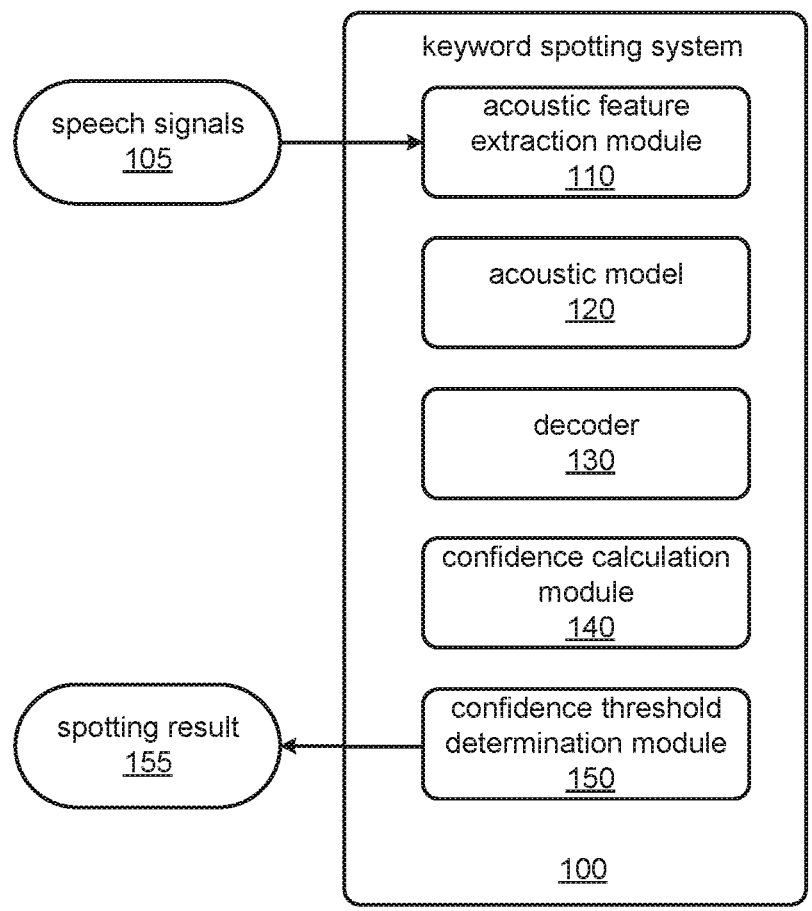
FIG. 1 illustrates exemplary keyword spotting system according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Speech-based spotting for given keywords may be used in fields such as device wakeup, command control, speech search, etc. Device wakeup refers to an activation of a device from a sleeping state to a running state. The keywords used to wake up the device may be those specified by for example the device vendors, such as "Hi Cortana", "Hi Xiaoice", etc. Command control refers to an execution of control operations corresponding to a specific command after detection of that specific command. Keywords used for command control may be phrases containing specific actions, such as "turn off cellphone", "turn on music player", etc. Speech search refers to searching a given keyword from a large number of acquired speech signals. For example, the given keyword may be a sensitive word, a trademark name, etc.

Taking device wakeup as an example, it has been widely used in various devices such as robot, smart home, on-board equipment, cellphone, wearable device, etc. As long as the device has a function of speech interaction, man-machine interaction can be initiated by recognizing a given keyword in speech input. In order to implement wakeup of a particular device, different devices may have different wakeup words, such as different given keywords. As can be seen, the variety of the devices with device wakeup capabilities will lead to the variety of given keywords used to wake up those devices. In addition, the given keywords used in the command control and speech search mentioned above may vary widely in different application scenarios.

Acoustic models are usually used by a keyword spotting system for keyword spotting. The existing acoustic model is a generic model which may theoretically support the spotting of any keyword, but cannot guarantee that the spotting of certain given keywords can satisfy the user's requirements. This is because there may be very little training data for certain keywords, or even a lack of training data for the certain given keywords. Therefore, the performance requirements of the keyword spotting system may not be satisfied when the existing acoustic model is used to spot a given keyword.

In order to train a high-quality acoustic model so that the keyword spotting system can achieve the desired performance requirements for the spotting of a given keyword, it usually needs to use hundreds or even thousands of hours of real-world speech data containing the given keyword and corresponding utterance texts to train the acoustic models. If a large amount of real-world speech data is acquired for each given keyword and the acquired speech data is manually marked, it will be very time-consuming and labor-intensive.

Embodiments of the present disclosure present methods and devices for optimizing a keyword spotting system. A given keyword may be utilized to generate an utterance text containing a given keyword, and then the text-to-speech (TTS) technology can be used to convert the utterance text into a corresponding speech signal. The given keyword can be a word (for example, "Cortana"), a word group or phrase consisting of multiple words (for example, "weather inquiry"), a short sentence (for example, "Hi Cortana"), etc. An utterance text may refer to utterance content represented in a text form. A speech signal may refer to a section of continuous audio signal. The synthesized speech signal can be used to optimize an acoustic model in the keyword spotting system, so that the optimized acoustic model can be used for spotting of a given keyword more effectively.

In addition, the embodiments of present disclosure may further, based on performance indexes of the keyword spotting system, adjust a confidence threshold corresponding to the given keyword utilizing a dataset including the given keyword and a dataset not including the given keyword, so that the keyword spotting based on the adjusted confidence threshold can satisfy the metric of correct accept (CA) and the metric of false accept (FA) required by the keyword spotting system.

FIG. 1 illustrates an exemplary keyword spotting system 100 according to an embodiment. As shown in FIG. 1, the exemplary keyword spotting system 100 may comprise an acoustic feature extraction module 110, an acoustic model 120, a decoder 130, a confidence calculation module 140 and a confidence threshold determination 150. The speech signals 105 are input to the acoustic feature extraction module 110, and then a spotting result 155 may be obtained after processed via the acoustic model 120, the decoder 130, the confidence calculation module 140 and the confidence threshold determination module 150 in sequence. The spotting result 155 indicates whether a given keyword is spotted from the input speech signals 105. Each module in the exemplary keyword spotting system 100 is illustrated in detail below.

Speech signals 105 may be a section of continuous audio signals to be spotted to see whether it contains a given keyword. The audio signal may be obtained by means of audio acquisition or by means of TTS.

The acoustic feature extraction module 110 may perform a series of processing on the input speech signals 105 to transform it from time domain to frequency domain, and extract acoustic features for the acoustic model 120. Acoustic features may refer to a characterization of a speech signal in frequency domain. For example, the acoustic features may be filter bank (Fbank) features, Mel Frequency Cepstral Coefficients (MFCC) features, etc. The following will describe how to perform acoustic feature extraction on speech signals in detail in combination with FIG. 2.

Acoustic model 120 may be a model, for example a seed acoustic model, pre-trained with a large amount of speech recognition data. The seed acoustic model may be trained for distinguishing between different phonemes, thereby achieving a mapping from acoustic features to phonemes. In the present disclosure, a phoneme may refer to the smallest unit constituting a speech. In addition, the acoustic model 120 in FIG. 1 may also be an acoustic model optimized from the seed acoustic model according to the embodiments of the present disclosure. For example, the acoustic model 120 can be a model, on the basis of the seed acoustic model, optimized from the seed acoustic model with at least the synthesized speech signal containing a given keyword in the present disclosure. As compared with the seed acoustic model, the optimized acoustic model has better spotting performance for given keywords. The optimization process for the acoustic model 120 is described in detail in combination with FIG. 3 and FIG. 4 below.

The acoustic model 120 classifies acoustic features of each input frame, corresponds the acoustic features of each frame to all possible phonemes, calculates a probability of each phoneme, and at last provides a probability vector containing the probabilities of each frame on all phonemes to the decoder 130. In one case, a sum of all elements in the probability vector may be 100%. The number of the elements in the probability vector depends on a modeling unit of the acoustic model and the number of phonemes included in a language used by the input speech signals. Assuming that a monophone is used as the modeling unit, the number of elements in the vector is equal to the number of phonemes contained in the language used by the input speech signals.

A decoding network for a given keyword may be built utilizing Weighted Finite State Shifter (WFST) according to multiple phonemes that constitute the given keyword and an order of these phonemes. Decoder 130 determines an optimal decoding path containing the given keyword according to a probability vector provided by the acoustic model 120 at each frame, and outputs probabilities of the phonemes corresponding to each frame on the optimal decoding path to the confidence calculation module 140.

Confidence calculation module 140 obtains the probabilities of phonemes corresponding to each frame on the optimal decoding path including the given keyword, and calculates a confidence value of the given keyword accordingly.

The confidence threshold determination module 150 compares the confidence value received from the confidence calculation module 140 with a confidence threshold to determine the spotting result 155. If the received confidence value is greater than the confidence threshold, the given keyword is determined to be spotted, otherwise the given keyword is determined to be not spotted. The confidence threshold can be a threshold pre-set for any keyword (for example, 0.5), a threshold pre-set for each given keyword according to experience, or a threshold for a given keyword adjusted according to performance indexes of the keyword spotting system in optimizing the acoustic model. A specific adjustment process for the confidence threshold is described below.

Figure 2:
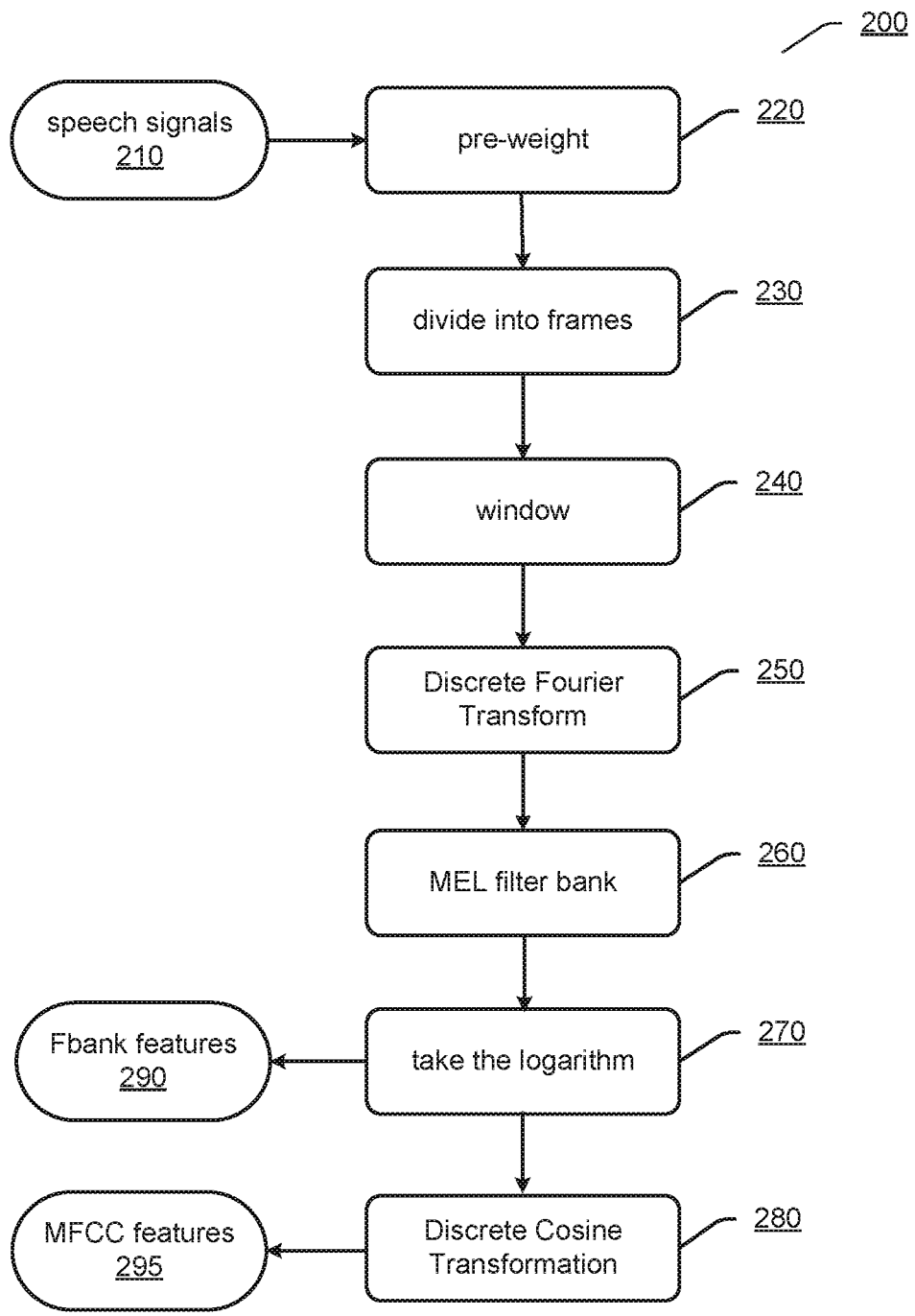
FIG. 2 illustrates an exemplary process for acoustic feature extraction according to an embodiment.

FIG. 2 illustrates an exemplary process 200 for acoustic feature extraction according to an embodiment. As shown in FIG. 2, it describes in detail how to extract acoustic features from an input speech signal 210, such as Fbank feature 290 or MFCC feature 295.

At 220, the speech signal 210 is pre-weighted. For example, the processing of pre-weighting may include applying a high-pass filter to speech signal 210 to compensate for the high frequency portion of the speech signal 210.

At 230, the pre-weighted speech signal is divided into frames. For example, a specified number of sampling points are defined as a frame of speech signal.

At 240, the divided speech signal is windowed. For example, each frame of speech signal may be multiplied by a Hamming window to increase the continuity between the left and right ends of the frame.

At 250, Discrete Fourier Transform is performed on the windowed signal. The characteristics of the signal can be better represented by transforming the signal from time domain to frequency domain. The spectrum of each frame of the speech signal may be obtained by Discrete Fourier Transform, and then a power spectrum of the speech signal may be obtained by taking a modular square of the spectrum.

At 260, a MEL filter bank is applied to the power spectrum of the speech signal to smooth the spectrum of the speech signal and eliminate harmonics.

At 270, an output of the MEL filter bank is taken the logarithm to obtain Fbank features 290. The Fbank features 290 is already very close to response characteristics of human ears. In view of the high feature correlation of the Fbank features, optionally, method 200 may include performing Discrete Cosine Transform at 280 on the output at 270 to obtain MFCC features 295.

After the processing of FIG. 2, an Fbank feature vector or an MFCC feature vector can be extracted from the speech signal 210 for spotting whether a given keyword is included in the speech signal 210 or for training or optimizing an acoustic model.

Figure 3:
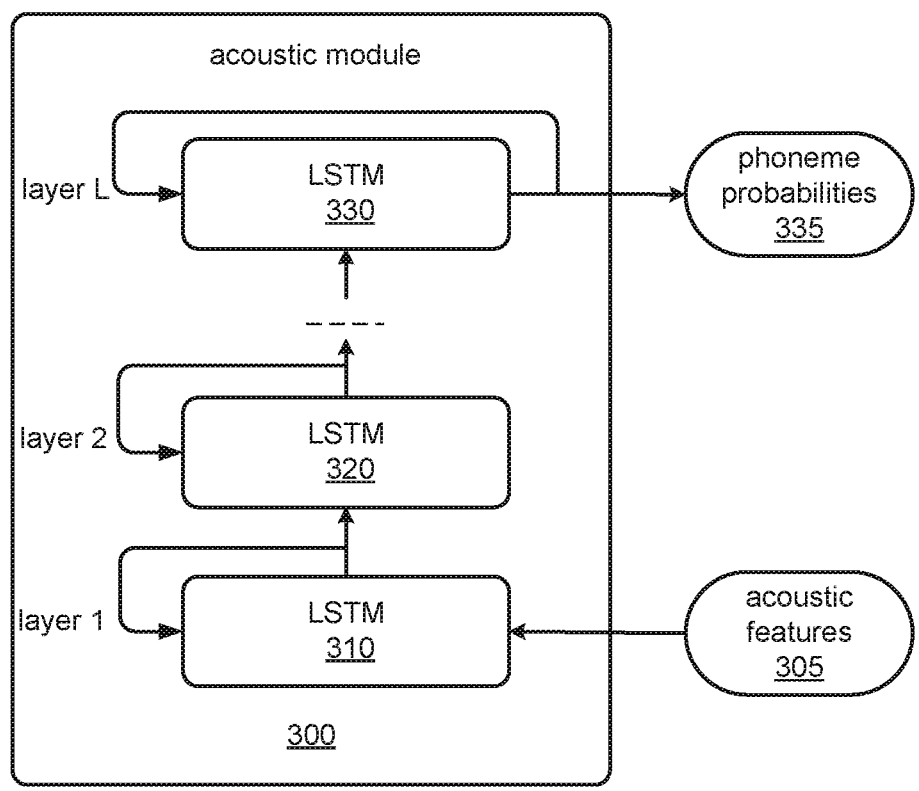
FIG. 3 illustrates an exemplary acoustic model according to an embodiment.

FIG. 3 illustrates an exemplary acoustic model 300 according to an embodiment. As shown in FIG. 3, Long Short Term Memory Recurrent Neural Network (LSTM-RNN) may be used to establish the exemplary acoustic model 300. For example, the acoustic model can be established by stacking multiple layers of LSTM (for example, L layers of LSTM).

When establishing an acoustic model, a monophone, a diphone or a triphone can be used as a modeling unit for establishing an acoustic model. The context of phonemes can be considered when establishing the acoustic model using a triphone as the modeling unit, so the accuracy of speech recognition can be improved. Since keyword spotting does not need to spot each word or character in the input speech signal, the requirement for the relevance between a part of phonemes in the speech signal is reduced. In addition, devices deploying keyword spotting systems typically have a requirement of low power consumption. Therefore, in order to reduce computational complexity and save power consumption, the acoustic model 300 can be established using either a monophone or a context-independent phoneme (ciphone) as the modeling unit. Take Chinese as an example below and assume that the number of phonemes included in Chinese is 98. It is noted that the embodiments of the present disclosure can be applied to various other languages in a similar manner. Different languages may include different numbers of phonemes due to their different pronunciations.

A large amount of speech recognition data can be utilized to train the acoustic model. The parameters of the acoustic model are trained to maximize negative cross entropy:

$$L = \frac{-1}{T}\sum_{t=1}^{T} L(x_t) = \frac{1}{T}\sum_{t=1}^{T}\sum_{y=1}^{S} \tilde{p}(y|x_t)\log p(y|x_t) \quad (1)$$

Wherein, $L(x_t)$ denotes a negative cross entropy value of the t-th frame, T denotes the number of frames of the speech signal, and L denotes a negative cross entropy value after averaged on T frames. S denotes the number of phonemes output to each frame by the acoustic model, such as a total number of phonemes included by the language used by speech signal input to the acoustic model. $x_t$ is acoustic feature 305 of the t-th frame input to the acoustic model. y is an index of output phoneme. $\tilde{p}(y|x_t)$ is a target probability, which typically is 0 or 1. If input $x_t$ corresponds to current phoneme y, then the target probability is 1, otherwise the target probability is 0. $p(y|x_t)$ denotes output probability of the acoustic model, for example, the output is a probability of phoneme y where the input is $x_t$.

The acoustic feature 305 of each frame extracted by the acoustic feature extraction module is input to the acoustic model 300, processed by L layers of LSTM (for example, LSTM 310, LSTM 320, ... LSTM 330, etc.), and at last the classified phoneme probabilities 335 of the acoustic features of the frame are output. Phoneme probabilities 335 may be a probability vector that includes the probabilities of the frame on all phonemes. The probability of the frame on one phoneme can be calculated as:

$$p(y=k|x_t) = \frac{\exp(z_k^L)}{\sum_n \exp(z_n^L)} \quad (2)$$

wherein $p(y=k|x_t)$ denotes a probability that index y equals to k where input is $x_t$. For example, p may be a posterior probability of a phoneme where the input acoustic features are given. k=1, ... S, wherein S is the number of phonemes output by the acoustic model, which may be the number (e.g., 98) of phonemes included in the language (e.g., Chinese) used by the speech signals. L is the number of layers of LSTM within the acoustic model. $z_k^L$ denotes output at the L-th layer for a phoneme with index k, n is from 1 to S.

The above acoustic model trained utilizing generic speech recognition data may theoretically support spotting of any keyword. The acoustic model can be used as a seed acoustic model. The seed acoustic model mentioned above may not be able to spot a given keyword well, since no special training data is used for the given keyword, or only a very limited training data is used for the given keyword. Therefore, the embodiments of the present disclosure may further optimize the seed acoustic model using optimization data including the given keyword.

Figure 4:
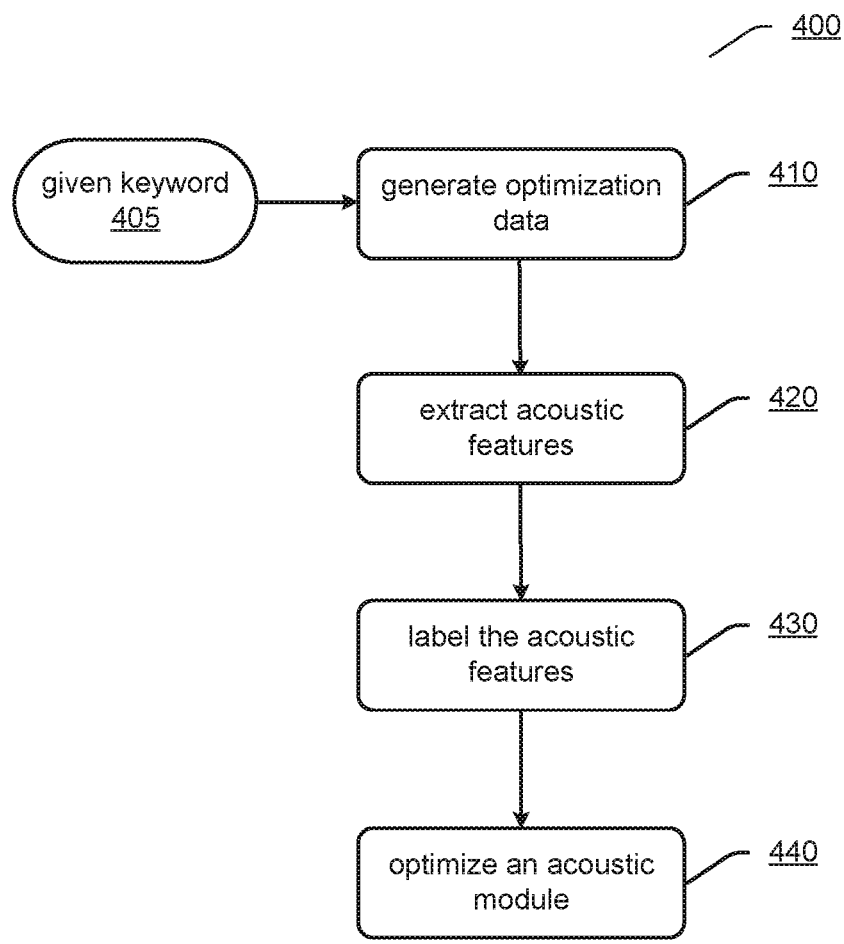
FIG. 4 illustrates an exemplary process for optimizing an acoustic model according to an embodiment.

FIG. 4 illustrates an exemplary process 400 for optimizing an acoustic model according to an embodiment. Process 400 can be performed for optimizing the seed acoustic model discussed above in conjunction with FIG. 3.

As shown in FIG. 4, at 410, the optimization data including a given keyword 405 is generated based on the given keyword 405. The optimization data can include an utterance text containing the given keyword and a speech signal synthesized based on the utterance text.

At 420, the process shown in FIG. 2 can be utilized to extract the acoustic features of the speech signal in the optimization data, such as Fbank features or MFCC features. The speech signal is converted into the acoustic features after acoustic feature extraction.

At 430, a phoneme-related label is assigned to the acoustic features of frame. For example, a pre-trained speech recognition system, such as a Hybrid Gaussian Model-Hidden Markov Model, a Deep Neural Network-Hidden Markov Model etc., can be used to assign labels. Suppose that for the utterance text "你好小娜 (Hi Cortana)", the acoustic features of 300 frames of the speech signals corresponding to the utterance text are to be marked.

First, "你好小娜 (ni hao xiao na)" may be broken down into the following set of phonemes according to the modeling unit:

"ni i_l i_h h aa_l o_l xi aa_l o_l n a_h a_l".

Then, a phoneme label is assigned to the acoustic features of each frame, for example:

Phoneme label ni is assigned to acoustic features of the 0-30th frame;

Phoneme label i_1 is assigned to acoustic features of the 31-50th frame;

. . .

Phoneme label a_1 is assigned to acoustic features of the 290-300th frame.

At 440, the seed acoustic model is optimized with the acoustic features of each frame and the phoneme labels corresponding to the acoustic features of each frame. For example, the seed acoustic model may be optimized using a loss function based on the Kullback-Leibler (KL) divergence. In order to achieve better optimization effect, a regularization term based on KL divergence can be added to the above equation (1). After removing the terms irrelevant to the acoustic model parameters, the following equation may be obtained:

$$\hat{L} = (1-\rho)\bar{L} + \rho \frac{1}{T}\Sigma_{t=1}^{T}\Sigma_{y=1}^{S} p^{SeedModel}(y|x_t)\log p(y|x_t) \quad (3)$$

The above equation (3) may be rewritten as:

$$\hat{L} = = \frac{1}{T}\Sigma_{t=1}^{T}\Sigma_{y=1}^{S} \hat{p}(y|x_t)\log p(y|x_t) \quad (4)$$

wherein:

$$\hat{p}(y|x_t) = (1-\rho)\tilde{p}(y|x_t) + \rho p^{SeedModel}(y|x_t) \quad (5)$$

wherein $p^{SeedModel}(y|x_t)$ denotes a posterior probability of phoneme y estimated after $x_t$ is input to a non-optimized seed acoustic model. $\rho$ denotes a regularization weight. If $\rho=1$, it means basically the non-optimized seed acoustic model is used, and if $\rho=0$, it means basically the acoustic model is retained purely based on speech signals synthesized by the present disclosure. As can be seen by comparing equation (1) and equation (4), applying KL divergence regularization term to original training criteria (that is, the loss function of equation (1)) is equivalent to changing target probability distribution from $i(yx_t)$ to $\hat{p}(y|x_t)$. If $\rho$ is between 0 and 1, then $\hat{p}(y|x_t)$ is a linear interpolation of the probability distribution estimated by the non-optimized seed acoustic model and the real probability marked by the optimization data. The interpolation prevents over-optimization by preventing the optimized acoustic model from deviating too far from the seed acoustic model.

Whether the acoustic model 300 is trained or further optimized, the outputs $p(y=k|x_t)$ of the acoustic model are calculated in the same way, that is, as shown in equation (2) above.

Next, how to generate the optimization data for optimizing the acoustic model is described in detail.

Figure 5:
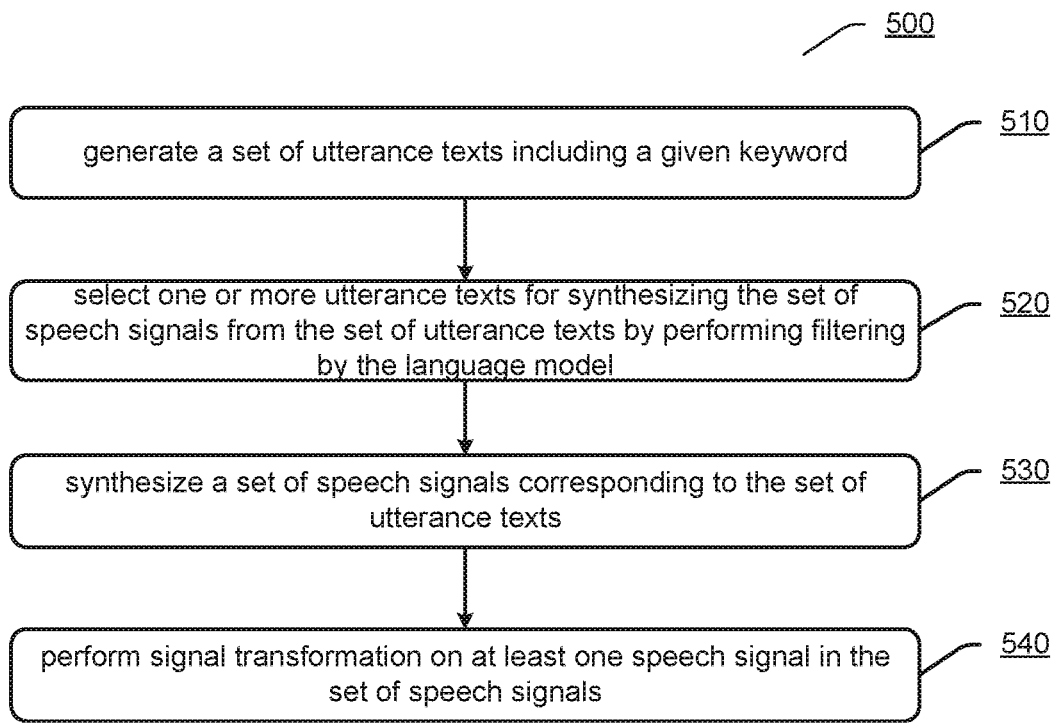
FIG. 5 illustrates an exemplary process for generating the optimization data according to an embodiment.

FIG. 5 illustrates an exemplary process 500 of generating the optimization data according to an embodiment.

As shown in FIG. 5, at 510 a set of utterance texts including a given keyword is generated. For example, the set of utterance texts including the given keyword may be generated in multiple ways, including but not limited to the following several implementations.

In one implementation, the given keyword can be concatenated with a group of reference utterance texts. The reference utterance text in this group of reference utterance texts can refer to any utterance text used to concatenate with a given keyword to form the set of utterance texts. For example, these reference utterance texts may be selected according to the usage scenarios, which can include a small-talk type of reference utterance texts, a work assistant type of reference utterance texts, etc. The reference utterance texts may be obtained from a public voice database or from the Internet. For example, this group of reference utterance texts can include: <please turn on the light>, <please play the music>, <how is the weather tomorrow>, etc.

A least one of the following ways can be employed to concatenate a given keyword and a reference utterance text.

In one way, the given keyword is placed in front of one or more reference utterance texts in the group of reference utterance texts respectively. Taking the above reference utterance texts and the given keyword "Hi Cortana" as an example, the set of utterance texts concatenated in this way can include, for example, <Hi Cortana, please turn on the light>, <Hi Cortana, please play the music>, <Hi Cortana, how is the weather tomorrow>, etc.

In one way, the given keyword is placed between any two reference utterance texts in the group of reference utterance texts respectively. Still taking the example of the above reference utterance texts and the given keyword "Hi Cortana", the set of utterance texts concatenated in this way can include, for example, <please turn on the light, Hi Cortana, please play the music>, <please turn on the light, Hi Cortana, how is the weather tomorrow>, <please play the music, Hi Cortana, how is the weather tomorrow>, etc. In addition, the order of the two reference utterance texts before and after the given keyword can be exchanged, thereby forming another set of concatenated utterance texts.

In one way, the given keyword is placed behind one or more reference utterance texts in the group of reference utterance texts respectively. Still taking the example of the above reference utterance texts and the given keyword "Hi Cortana", the set of utterance texts concatenated in this way can include, for example, <please turn on the light, Hi Cortana>, <please play the music, Hi Cortana>, <how is the weather tomorrow, Hi Cortana>, etc.

Figure 6:
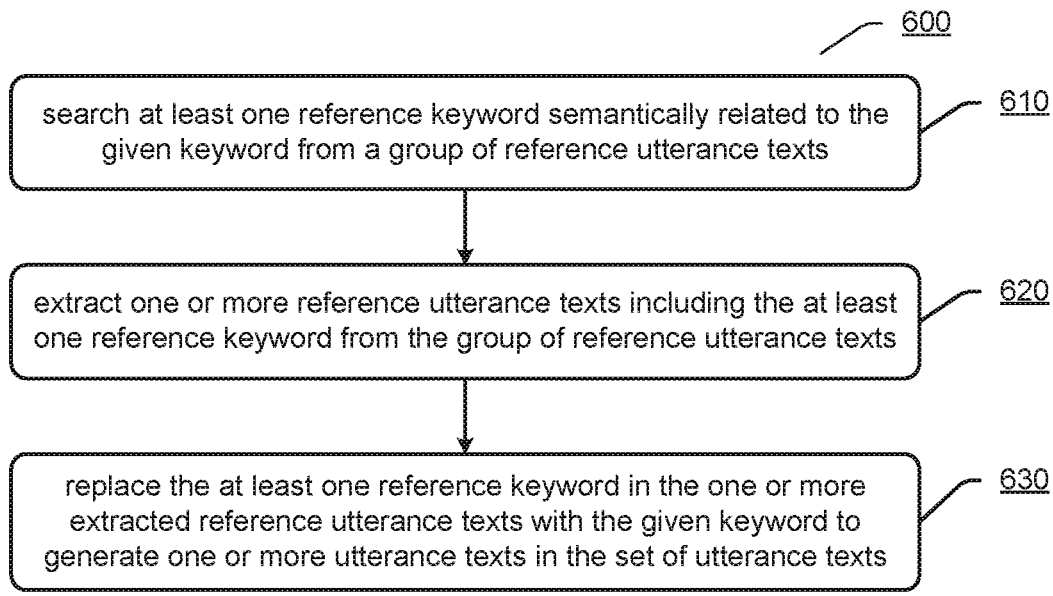
FIG. 6 illustrates an exemplary process for generating a set of utterance texts according to an embodiment.

In another implementation, a set of utterance texts including the given keyword can be generated by searching reference keywords semantically related to the given keyword from a group of reference utterance texts and replacing the reference keywords with the given keyword. For example, FIG. 6 illustrates an exemplary process 600 for generating a set of utterance texts according to an embodiment.

At 610, at least one reference keyword semantically related to the given keyword is searched from a group of reference utterance texts. The semantic correlation can be determined by calculating the cosine distance between the vector representations of two words in vector space. If the calculated cosine distance is greater than a predetermined distance threshold, then the two words can be determined as semantically related words. For example, it is assumed that this group of reference utterance texts may include: <good morning Xiaoice, please check the latest flight from Beijing to Shanghai>, <hello Duer, search the restaurants with the best reputation>, <please search for the most popular movies>, etc. First, the given keyword "Hi Cortana" is converted into a respective word vector, and then each word in the group of reference utterance texts is converted into its respective word vector. Assume it is found that "good morning Xiaoice" and "hello Duer" satisfy the above distance threshold for determining the semantic correlation by calculating the cosine distance between the word vector of the given keyword and each word vector in the group of reference utterance texts. Therefore, "good morning Xiaoice" and "hello Duer" may be considered as reference keywords semantically related to the given keyword "Hi Cortana".

At 620, one or more reference utterance texts including the at least one reference keyword is extracted from the group of reference utterance texts. the above group of reference utterance texts is still taken as an example to illustrate. Since it is searched out that "good morning Xiaoice" and "hello Duer" are reference keywords semantically related to "Hi Cortana", the reference utterance texts in which these two keywords lie are extracted: <good morning Xiaoice, please check the latest flight from Beijing to Shanghai>, <hello Duer, search the restaurants with the best reputation>.

At 630, the given keyword is utilized to replace the at least one reference keyword in the extracted one or more reference utterance texts to generate one or more utterance texts in the set of utterance texts. For example, "Hi Cortana" may be used to respectively replace "good morning Xiaoice" in the reference utterance texts <good morning Xiaoice, please check the latest flight from Beijing to Shanghai> and "hello Duer" in the reference utterance texts <hello Duer, search the restaurants with the best reputation>, in order to form utterance texts in the set of utterance texts: <Hi Cortana, please check the latest flight from Beijing to Shanghai>, <Hi Cortana, search the restaurants with the best reputation>.

Figure 7:
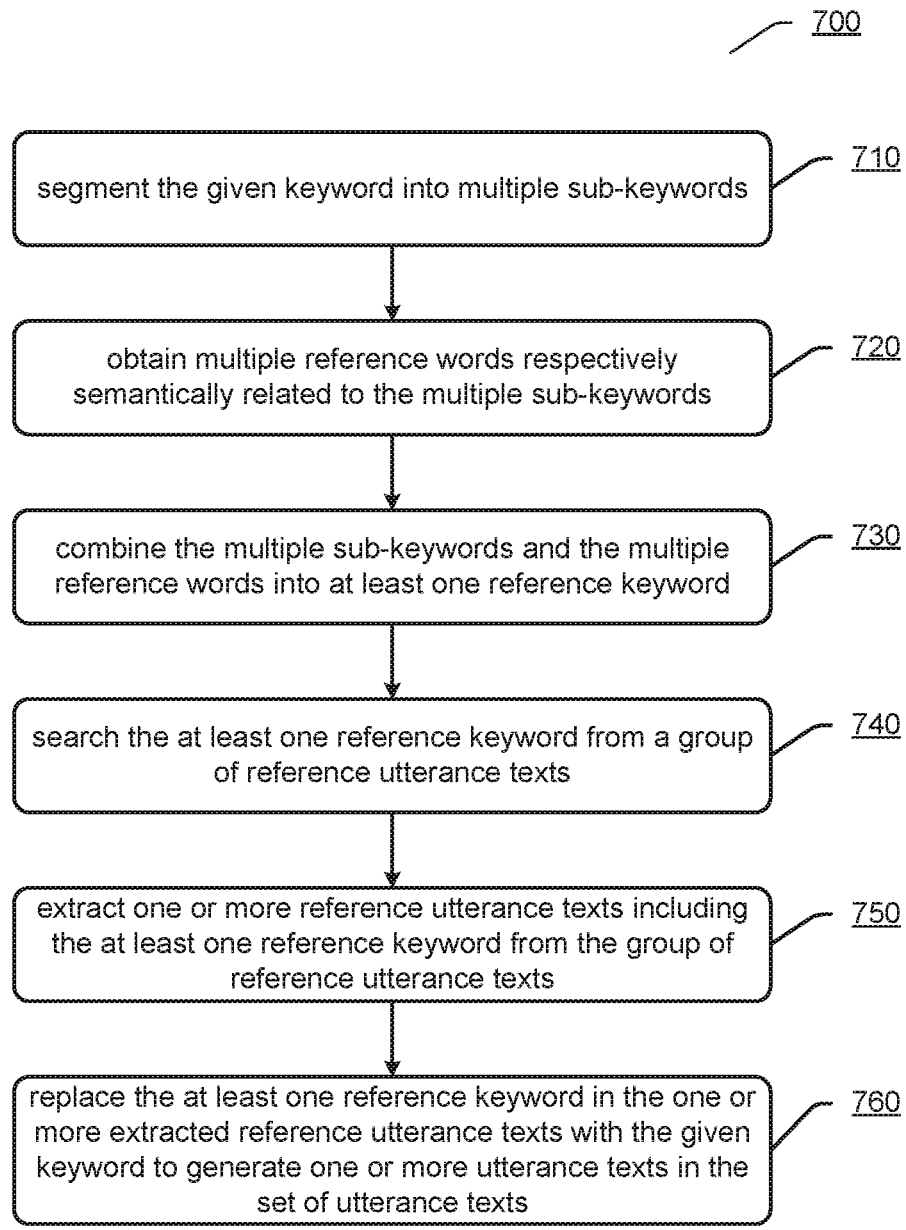
FIG. 7 illustrates another exemplary process for generating a set of utterance texts according to an embodiment.

In yet another implementation, a set of utterance texts including the given keyword may be generated by the way of synthesizing a reference keyword semantically related to the given keyword, then searching the reference keyword from a group of reference utterance texts, and replacing the reference keyword with the given keyword. For example, FIG. 7 illustrates another exemplary process 700 for generating a set of utterance texts according to an embodiment.

At 710, the given keyword is segmented into multiple sub-keywords. Taking "Hi Cortana" as an example, the given keyword can be segmented into two sub-keywords: "hi" and "Cortana".

At 720, multiple reference words semantically related to the multiple sub-keywords respectively are obtained. Reference words semantically related to each sub-keyword may be respectively obtained from the public speech database or from the Internet. In addition, reference words may be obtained from a pre-designed dictionary. Similar to the description at 610, multiple reference words semantically related to each sub-keyword can be searched for by calculating a cosine distance between the two word vectors. Obtaining it from a dictionary is taken as an example to illustrate. For example, by calculating the cosine distance between the vector of one or more words in the dictionary and the vector of the sub-keyword "hi", the following reference words are obtained by searching: "hi", "hello", "good morning", "good evening", etc. Then by calculating the cosine distance between the vector of one or more words in the dictionary and the vector of the sub-keyword "Cortana", the following reference words are obtained by searching: "Cortana", "Xiaoice", "Duer", "Xiaoai", etc.

At 730, the multiple sub-keywords and the multiple reference words are combined into at least one reference keyword. In one implementation, the sub-keywords "hi" may be combined respectively with the reference words "Xiaoice", "Duer" and "Xiaoai" into reference keywords, such as "Hi Xiaoice", "Hi Duer" and "Hi Xiaoai"; the sub-keyword "Cortana" may be combined respectively with the reference words "hello", "good morning" and "good evening" into reference keywords, such as "hello Cortana", "good morning Cortana" and "good evening Cortana". In another implementation, the obtained multiple reference words semantically related to each sub-keyword can be combined with one another into reference keywords. For example, a group of reference words "hello", "good morning", "good evening" are combined respectively with another group of reference words "Xiaoice", "Duer", "Xiaoai" into the reference keywords, such as "hello Xiaoice", "hello Duer", "hello Xiaoai", "good morning Xiaoice", "good morning Duer", "good morning Xiaoai", "good evening Xiaoice", "good evening Duer", "good evening Xiaoai", etc.

At 740, the at least one reference keyword is searched from a group of reference utterance texts. It is assumed that the set of utterance texts may include the following utterance texts: <good evening Xiaoice, please inquire tomorrow's weather>, <good morning Duer, please play the music>, <please turn off the light>, etc. It is found by searching that the first two utterance texts in this set of utterance texts contain the reference keywords "good evening Xiaoice" and "good morning Duer".

At 750, the one or more reference utterance text containing at least one reference keyword is extracted from the group of reference utterance texts. For example, as it is found by searching that the two utterance texts in this set of utterance texts contain the reference keywords "good evening Xiaoice" and "good morning Duer", the reference utterance texts in which these two reference keywords lie are extracted: <good evening Xiaoice, please inquire tomorrow's weather>, <good morning Duer, please play the music>.

At 760, the given keyword is utilized to replace the at least one reference keyword in one or more extracted reference utterance texts to generate one or more utterance texts in the set of utterance texts. For example, the reference keyword "good evening Xiaoice" in reference utterance texts <good evening Xiaoice, please inquire tomorrow's weather> is replaced with the given keyword "Hi Cortana" and the reference keyword "good morning Duer" in reference utterance texts <good morning Duer, please play the music> is replaced with the given keyword "Hi Cortana", thereby generating utterance texts in a set of utterance texts: <Hi Cortana, please inquire tomorrow's weather>, <Hi Cortana, please play the music>.

Back to FIG. 5, in the process of generating the optimization data, optionally, one or more utterance texts for synthesizing the set of speech signal can also be selected from the set of utterance text sets through performing filtering by a language model at 520. Taking the above mentioned way of concatenating as an example, at least due to the fact that the set of utterance texts for concatenating may be randomly selected, the resulting utterance texts including the given keyword may not conform to the language logic after the given keyword is concatenated with the set of utterance texts, for example, <Hi Cortana, Xiaoice turn on the light>. In order to generate high-quality optimization data, the utterance texts that conform to language logic can be directly selected from the set of utterance texts based on the language model, or the utterance texts that do not conform to language logic may be removed from the set of utterance texts for further synthesizing speech signals. For example, the language model score of the concatenated utterance texts may be calculated based on the pre-trained language model, wherein the language model may be an n-gram language model. If the score of the concatenated utterance texts calculated by the language model is higher than the predefined language logic threshold, then it is determined that the concatenated utterance texts conform to language logic and may be used to synthesize speech signals, otherwise, it is determined that the concatenated utterance texts do not conform to language logic and cannot be used to synthesize speech signals. It is noted that the filtering and selecting process may also be applied to the situation where the reference keywords in the set of utterance texts are replaced with the given keyword.

At 530, a set of speech signals corresponding to the set of utterance texts is synthesized. For example, existing TTS technology may be used to synthesize utterance texts into speech signals. When synthesizing speech signals for each utterance text in the set of utterance texts, the voices of different speakers may be set so that the synthesized speech signals can simulate different speakers. These different speakers may include at least one of: speakers of different genders, speakers of different ages and speakers with different accents. In addition, the distance between the speaker and the microphone can also be considered when synthesizing speech signals, different distances can reflect different energies of speech signals.

Optionally, in order to diversify the optimization data, signal transformation may also be performed on at least one speech signal in the set of speech signals at 540. For example, the signal transformation may include at least one of: adding background noise, performing speed perturbation, and applying a room impulse response.

As for adding background noise, the noise signal in time domain may be directly overlaid on the synthesized speech signal, thereby generating the speech signal with background noise added. This not only increases the diversity of the optimization data, but also makes the signal-transformed speech signals be closer to the speech signals acquired in the real-world situation.

As for performing speed perturbation, the speed of speech signals may be reduced by copying, in time domain, a portion of sampling points in the waveform of the synthesized speech signals, or the speed of speech signals may be increased by extracting a portion of sampling points in the waveform of the synthesized speech signals. Therefore, for a section of the synthesized speech signals, a speed perturbation of the section of speech signals may be achieve by copying a part of sampling points and extracting another part of sampling points. In addition, speed perturbation of the section of speech signals may be achieved by copying a different numbers of sampling points and/or extracting a different numbers of sampling points for the section of synthesized speech signals.

As for applying of a room impulse response, the room impulse response may characterize at least one of: a delay between the speaker and the microphone, a level ratio of direct sound to reverberant sound, early and late decay rate of sound, and a frequency response of direct sound. The premeasured room impulse response may be convolved with the synthesized speech signals, thereby obtaining the speech signal with the room impulse response applied.

How to generate the optimization data and how to utilize the optimization data to optimize the acoustic model in the keyword spotting system are describe above in detail in connection with FIG. 3 to FIG. 7. After optimizing the acoustic model, it may be utilized to achieve the spotting of the given keyword. The optimized acoustic model may receive acoustic features extracted from the speech signals and pass the probabilities of phonemes as calculated according to equation (2) above to a decoder to further determine whether there is an optimal decoding path including the given keyword.

Figure 8:
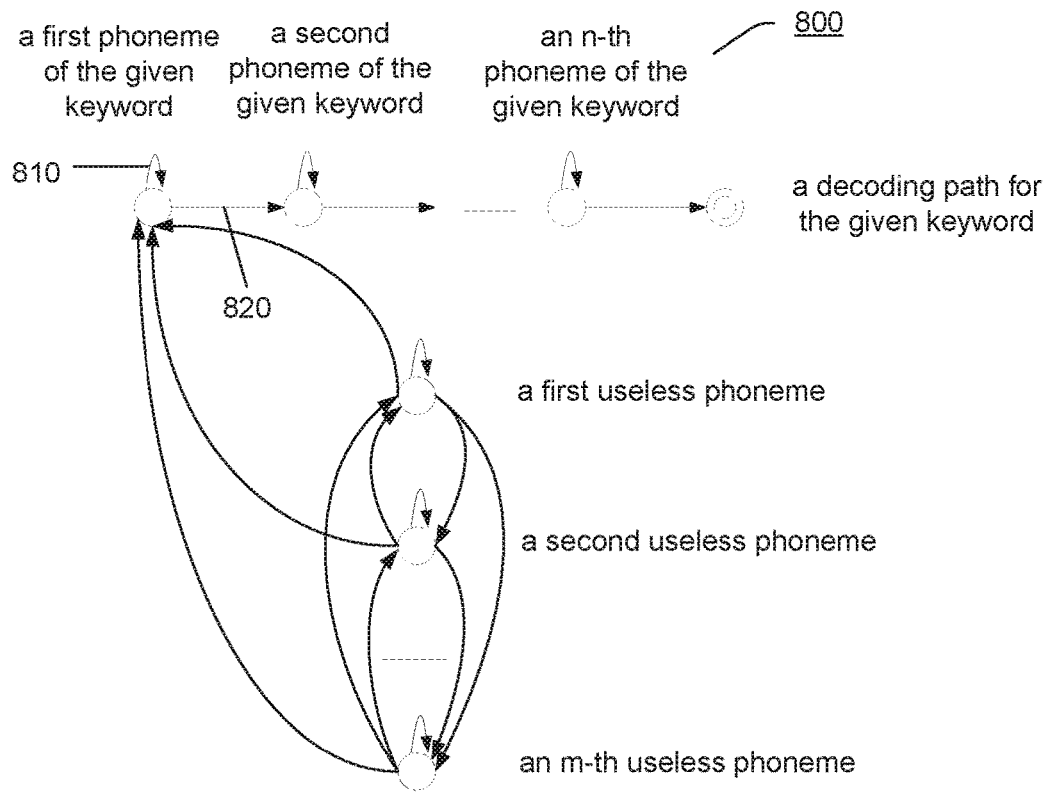
FIG. 8 illustrates an exemplary decoding network for a given keyword according to an embodiment.

FIG. 8 illustrates an exemplary decoding network 800 for a given keyword according to an embodiment. The decoder network 800 may be used by the decoder 130 in FIG. 1. Assuming that the language employed by the input speech signals includes a total of S monophones, then under the condition that the monophones are used as the unit for modeling, there are theoretically $S^T$ possible decoding paths for T frames of speech signals. The number $S^T$ is too large, and most of the $S^T$ possible decoding paths are meaningless. Therefore, in order to reduce the complexity of the decoding network, as shown in FIG. 8, a reduced version of the decoding network may be established based on WFST and the given keyword in order to constrain the possible decoding paths.

The reduced version of the decoding network includes two parts, the upper part is a state transfer process of the decoding paths for the given keyword, and the lower part is a schematic state transfer process of the useless decoding paths other than the given keyword. Each node in FIG. 8 may correspond to one of multiple phonemes in the output of the acoustic model, and each line with an arrow has a predetermined weight, which may be regarded as a transfer probability.

As shown in the upper part of FIG. 8, the given keyword may be broken down into N phonemes arranged in order according to the modeling unit of the acoustic model (for example, monophone). It should be noted that, according to the pronunciation of the given keyword, these N phonemes may include a same phoneme. For illustrative purposes, it is assumed that the adjacent phonemes in a decoding path for the given keyword are different. Since each phoneme may last for several frames, in the decoding path of the given keyword in FIG. 8, there may be self-transfer 810 of a phoneme, and over time, inter-phoneme transfer 820 will occur after several frames.

As shown in the lower part of FIG. 8, at least the phonemes other than the phonemes corresponding to the given keyword may be regarded as useless phonemes, these useless phonemes may be interconnected to form useless decoding paths. In the absence of the given keyword in the speech signals, the output of the acoustic model may jump between these useless phonemes. In addition, any one of these useless phonemes may jump to the first phoneme in the given keyword path.

Figure 9:
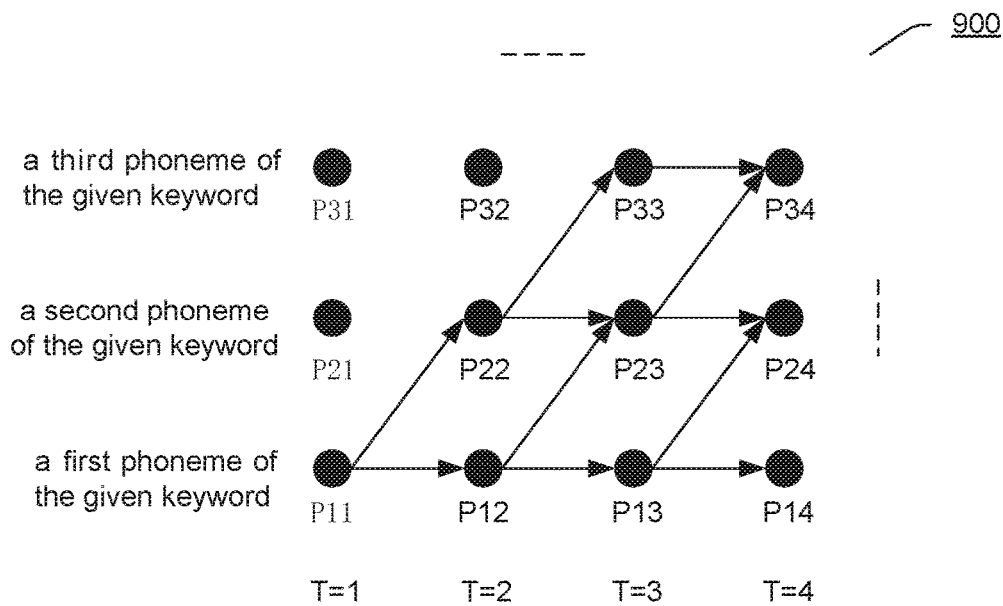
FIG. 9 illustrates an exemplary decoding process according to an embodiment.

FIG. 9 illustrates an exemplary decoding process 900 according to an embodiment. As shown in FIG. 9, the decoding process 900 may be based on the decoding network 800 in FIG. 8.

Where the given input acoustic feature vector $X=(x_1, x_2 \ldots, x_T)$, the decoding process 900 may use Viterbi algorithm to calculate a joint probability in equation (6) below to find a label sequence vector $Y=(y_1, y_2 \ldots, y_T)$ which maximize the joint probability:

$$p(x_1, x_2 \ldots, x_T, y_1, y_2 \ldots, y_T) = \Pi_{i=1}^{T} p(x_i | y_i) \cdot p(y_i | y_{i-1}) \quad (6)$$

wherein, $$p(x_i | y_i) = \frac{p(y_i | x_i)}{p(y_i)} \cdot p(x_i) \quad (7)$$

wherein, $p(x_i)$ may be removed from equation (7), because it is the same to all possible $y_i$. $y_i$ may be 1 to S, which is used to identify phonemes. $p(y_i)$ is a priori probability of phoneme $y_i$, which may be estimated from training data. $p(y|x_i)$ is an output probability of the acoustic model, such as a probability that output is phoneme $y_i$ where the input is $x_i$. $p(y|y_{i-1})$ is a transfer probability between phonemes.

As shown in FIG. 9, it is assumed that the given keyword may be split into three phonemes, and that the input speech signal is 4 frames. For multiple possible decoding paths of the given keyword, according to the decoding network in FIG. 8, the first phoneme of the given keyword may only be transferred to the first phoneme of the given keyword (i.e., self-transfer, such as P11→P12, P12→P13, etc.) and the second phoneme of the given keyword (i.e., inter-phoneme transfer, such as P11→P22, P12→P23, etc.); the second phoneme of the given keyword may only be transferred to the second phoneme of the given keyword (i.e., self-transfer, such as P22→P23, P23→P24, etc.) and the third phoneme of the given keyword (i.e., inter-phoneme transfer, such as P22→P33, P23→P34, etc.); etc.

At each time T=T' (i.e., the T'-th frame), Viterbi algorithm may be used to calculate the best decoding path score $p(x_1, x_2 \ldots, x_{T'}, y_1, y_2 \ldots, y_{T'})$ till the current time T', where $y_{T'}=k$, $k=1, 2, \ldots$ M+N. M+N is the total number of nodes in FIG. 8, i.e. the total number of phonemes that constitute the decoding network in FIG. 8. It is assumed that an index of the last phoneme in the decoding path for the given keyword is $N_k$ (i.e., N in FIG. 8). If $p(x_1, x_1 \ldots, x_{T'}, y_1, y_1 \ldots, y_{T'}=N)$ is greater than $p(x_1, x_1 \ldots, x_{T'}, y_1, y_1 \ldots, y_{T'}=N_k)$, it means that the current optimal decoding path is the decoding path for the given keyword, where i≠k. Then, probabilities of phonemes corresponding to each frame on the current optimal decoding path is provided to the confidence calculation module 140.

Next, the given keyword containing three phonemes is taken as an example to illustrate the exemplary decoding process.

Referring to FIG. 9, for possible decoding paths of the given keyword, it is assumed that at time T=1, the score of the current optimal decoding path is $p(x_1, 1)$, which indicates that at time T=1, the probability of the phoneme whose output index being 1 is the greatest. At time T=2, the possible decoding paths including the given keyword may include two paths: (1) P11→P12; (2) P11→P22. It is assumed that after calculation, the decoding path (1) may be determined to be the best decoding path according to the joint probability score, and its score is $p(x_1,x_2,1,1)$, which indicates that the joint probability of the phoneme whose joint output index is (1, 1) is the greatest at time T=2. At time T=3, the possible decoding paths including the given keyword may include two paths: (1) P11→P12→P23; (2) P11→P12→P13. It is assumed that after calculation, the decoding path (1) may be determined to be the best decoding path according to the joint probability score, and its score is $p(x_1, x_2, x_3, 1, 1, 2)$, which indicates that the joint probability of phonemes whose joint output index is (1, 1, 2) is the greatest at time T=3. At time T=4, the possible decoding paths including the given keyword may include two paths: (1) P11→P12→P23→P34; (2) P11→P12→P23→P24. It is assumed that after calculation, the decoding path (1) may be determined to be the best decoding path according to the joint probability score, and its score is $p(x_1, x_2, x_3, x_4, 1,1,2,3)$, which indicates that the joint probability of phonemes whose joint output index is (1,1,2,3) is the greatest at time T=4. At time T=4, the input acoustic feature vector X has flowed through all the phonemes of the given keyword, so the decoding path (1) at time T=4 is the best decoding path including the given keyword decoded by a decoder. The decoder provides phoneme probabilities corresponding to each time node on the optimal decoding path to a subsequent confidence calculation module 140.

Figure 10:
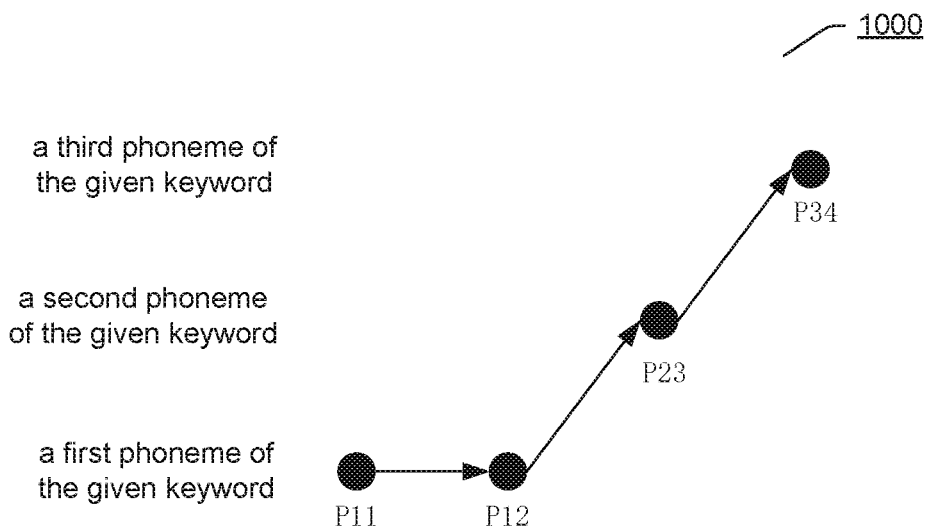
FIG. 10 illustrates a decoded output for an exemplary given keyword according to an embodiment.

FIG. 10 illustrates a decoded output 1000 for the exemplary given keyword according to an embodiment.

As shown in FIG. 10, the decoder will pass, to the confidence calculation module 140, the probability of the phoneme whose index is 1 at time T=1 (i.e., the first phoneme of the given keyword), the probability of the phoneme whose index is 1 at time T=2 (i.e., the first phoneme of the given keyword), the probability of the phoneme whose index is 2 at time T=3 (i.e., the second phoneme of the given keyword), and the probability of the phoneme whose index is 3 at time T=4 (i.e., the third phoneme of the given keyword).

In consideration of the speech speed of the speaker, a phoneme may last for multiple frames. The confidence calculation module 140 may select the maximum probability from multiple probabilities of the same phoneme that lasts for multiple frames as a final probability of the phoneme. Then, for all the phonemes of the given keyword, the average value of the probabilities of these phonemes is calculated. For example, the probabilities of all phonemes (for example, N phonemes) of the given keyword may be multiplied and extracted the N-th root, thereby obtaining the average probability of all phonemes of the given keyword, and this average probability may be used as the confidence value of the given keyword. The confidence value calculated by this method not only eliminates the influence of different speech speeds on the spotting results, but also reduces the influence of different lengths of the given keywords on the spotting results.

Referring to FIG. 10 again, since the first phoneme in the decoding path including the given keyword lasts for 2 frames (i.e., T=1 and T=2, hereinafter referred to as the first frame and the second frame), for the first phoneme, the maximum probability may be selected from these two frames as the probability of the first phoneme. Next the probability of the selected probability of the first phoneme is multiplied by the probability of the second phoneme in the third frame and the probability of the third phoneme in the fourth frame, and then cubic root of the product is extracted, thereby obtaining the average probability of all phonemes for the given keyword, and the average probability is regarded as the confidence value of the given keyword.

Confidence threshold determination module 150 can determine the spotting result by comparing the above confidence value with the confidence threshold. As mentioned in FIG. 1, the confidence threshold corresponding to the given keyword may be adjusted to satisfy the performance indexes of the keyword spotting system. The performance indexes of the keyword spotting system may include, but are not limited to, a metric of correct accept and a metric of false accept for the given keyword. The metric of correct accept may be reflected by the spotting accuracy, which may be calculated by dividing the number of given keyword utterances correctly spotted by the total number of given keyword utterances. The metric of false accept may be reflected by the number of false-spotting of given keyword utterances in the absence of given keyword utterance within each hour.

Based on the above performance indexes of the keyword spotting system, the adjusting the confidence threshold may include: performing keyword spotting by the keyword spotting system on a dataset including the given keyword and a dataset not including the given keyword; and adjusting the confidence threshold at least based on the result of keyword spotting and the performance indexes.

In one aspect, in order to determine the confidence threshold for the given keyword that satisfies the above performance indexes, a dataset including the given keyword may be prepared in advance, which includes speech signals containing the given keyword. The keyword spotting system of the present disclosure is utilized to determine the number of given keyword utterances that can finally be spotted by using the dataset, and then a spotting accuracy may be calculated according to the known total number of given keyword utterances included in this dataset. Optionally, the dataset including the given keyword may include for example at least a portion of the set of speech signals synthesized at 530 of FIG. 5. On the other hand, it is also possible to prepare in advance a dataset that does not include the given keyword, the dataset including speech signals that do not include that given keyword. The keyword spotting system of the present disclosure is utilized to determine the number of given keyword utterances finally spotted within each hour using this dataset, and it is taken as the number of false accepts per hour. Finally, the confidence threshold corresponding to the spotting accuracy and the number of false accepts per hour that satisfy the requirements of the keyword spotting system may be selected according to a relationship between the confidence threshold and the respective spotting accuracy and the number of false accepts per hour.

Figure 11:
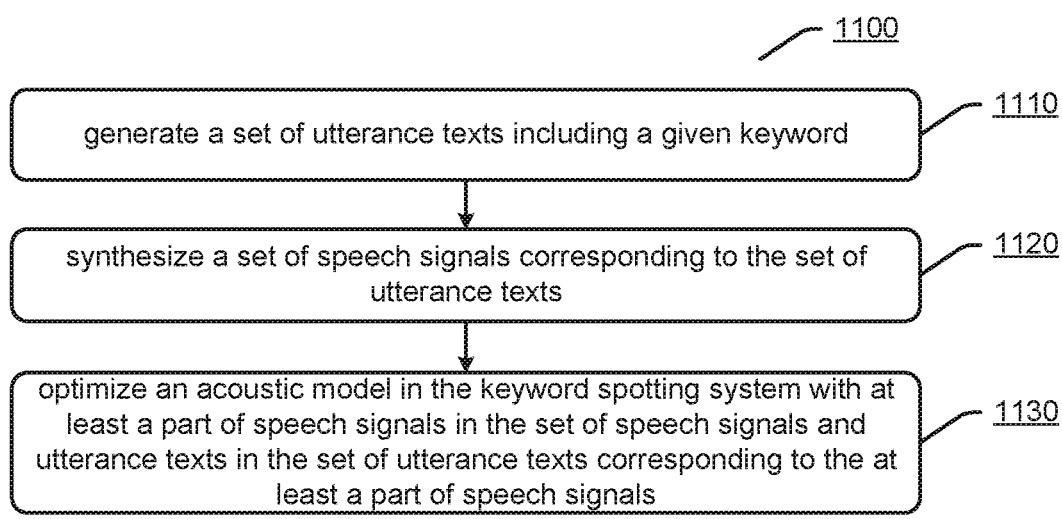
FIG. 11 illustrates a flowchart of an exemplary method for optimizing a keyword spotting system according to an embodiment.

FIG. 11 illustrates a flowchart of an exemplary method 1100 for optimizing the keyword spotting system according to an embodiment.

At 1110, a set of utterance texts including a given keyword may be generated.

At 1120, a set of speech signals corresponding to the set of utterance texts may be synthesized.

At 1130, an acoustic model in the keyword spotting system may be optimized with at least a part of speech signals in the set of speech signals and utterance texts in the set of utterance texts corresponding to the at least a part of speech signals.

In one implementation, the generating a set of utterance texts including the given keyword may comprise: concatenating the given keyword and a group of reference utterance texts.

In one implementation, the concatenating the given keyword and a group of reference utterance texts may comprise at least one of: placing the given keyword in front of one or more reference utterance texts in the group of reference utterance texts respectively; placing the given keyword between any two reference utterance texts in the group of reference utterance texts respectively; and placing the given keyword behind one or more reference utterance texts in the group of reference utterance texts respectively.

In one implementation, the generating a set of utterance texts including the given keyword may comprise: searching at least one reference keyword semantically related to the given keyword from a group of reference utterance texts; extracting one or more reference utterance texts including the at least one reference keyword from the group of reference utterance texts; and replacing the at least one reference keyword in the extracted one or more reference utterance texts with the given keyword to generate one or more utterance texts in the set of utterance texts.

In one implementation, the generating a set of utterance texts including the given keyword may comprise: segmenting the given keyword into a plurality of sub-keywords; obtaining a plurality of reference words semantically related to the plurality of sub-keywords respectively; combining the plurality of sub-keywords and the plurality of reference words into at least one reference keyword; searching the at least one reference keyword from a group of reference utterance texts; extracting one or more reference utterance texts including the at least one reference keyword from the group of reference utterance texts; and replacing the at least one reference keyword in the extracted one or more reference utterance texts with the given keyword to generate one or more utterance texts in the set of utterance texts.

In one implementation, the method 1100 may further comprise: selecting one or more utterance texts for synthesizing the set of speech signals from the set of utterance texts through performing filtering by a language model.

In one implementation, the method 1100 may further comprise: performing a signal transformation on at least one speech signal in the set of speech signals.

In one implementation, the signal transformation may comprise at least one of: adding background noise; performing speed perturbation; and applying a room impulse response.

In one implementation, a loss function for optimizing the acoustic model may be based on Kullback-Leibler (KL) divergence.

In one implementation, method 1100 may further comprise: adjusting a confidence threshold corresponding to the given keyword to satisfy performance indexes of the keyword spotting system.

In one implementation, the adjusting a confidence threshold may comprise: performing keyword spotting by the keyword spotting system on a dataset including the given keyword and a dataset not including the given keyword, the dataset including the given keyword comprising at least another part of speech signals in the set of speech signals; and adjusting the confidence threshold based at least on a result of the keyword spotting and the performance indexes.

In one implementation, the performance indexes of the keyword spotting system may comprise a metric of correct accept and a metric of false accept for the given keyword.

In one implementation, the synthesizing a set of speech signals corresponding to the set of utterance texts may comprise: for each utterance text in the set of utterance texts, synthesizing a plurality of speech signals in voices of different speakers.

In one implementation, the different speakers may comprise at least one of: speakers of different genders, speakers of different ages and speakers with different accents.

It should be understood that the method 1100 may also include any steps/processing for optimizing the keyword spotting system according to the above disclosed embodiments.

Figure 12:
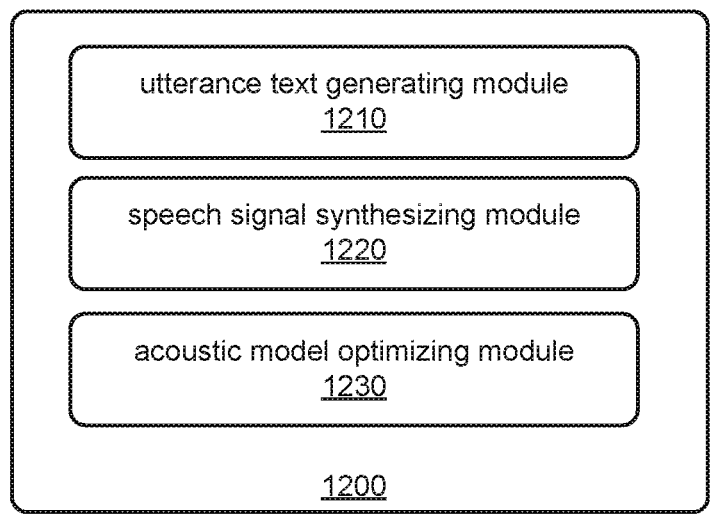
FIG. 12 illustrates an exemplary apparatus for optimizing a keyword spotting system according to an embodiment.

FIG. 12 illustrates an exemplary apparatus 1200 for optimizing a keyword spotting system according to an embodiment.

The apparatus 1200 may comprise: an utterance text generating module 1210, for generating a set of utterance texts including a given keyword; a speech signal synthesizing module 1220, for synthesizing a set of speech signals corresponding to the set of utterance texts; and an acoustic model optimizing module 1230, for optimizing an acoustic model in the keyword spotting system with at least a part of speech signals in the set of speech signals and utterance texts in the set of utterance texts corresponding to the at least a part of speech signals.

In one implementation, the utterance text generating module 1210 may be used for: concatenating the given keyword and a group of reference utterance texts.

In one implementation, the utterance text generating module 1210 may be used for: searching at least one reference keyword semantically related to the given keyword from a group of reference utterance texts; extracting one or more reference utterance texts including the at least one reference keyword from the group of reference utterance texts; and replacing the at least one reference keyword in the extracted one or more reference utterance texts with the given keyword to generate one or more utterance texts in the set of utterance texts.

In one implementation, the utterance text generating module 1210 may be used for: segmenting the given keyword into a plurality of sub-keywords; obtaining a plurality of reference words semantically related to the plurality of sub-keywords respectively; combining the plurality of sub-keywords and the plurality of reference words into at least one reference keyword; searching the at least one reference keyword from a group of reference utterance texts; extracting one or more reference utterance texts including the at least one reference keyword from the group of reference utterance texts; and replacing the at least one reference keyword in the extracted one or more reference utterance texts with the given keyword to generate one or more utterance texts in the set of utterance texts.

In one implementation, the apparatus 1200 may further comprise: a confidence threshold adjusting module, for adjusting a confidence threshold corresponding to the given keyword to satisfy performance indexes of the keyword spotting system.

In addition, the apparatus 1200 may further comprise any other modules configured to optimize the keyword spotting system according to the disclosed embodiments.

Figure 13:
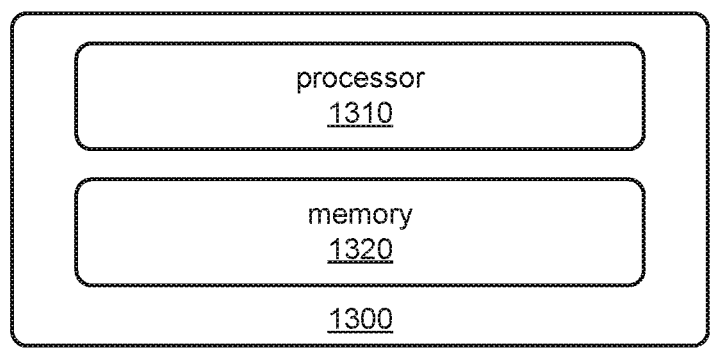
FIG. 13 illustrates an exemplary apparatus for optimizing a keyword spotting system according to an embodiment.

FIG. 13 illustrates an exemplary apparatus 1300 for optimizing a keyword spotting system according to an embodiment.

The apparatus 1300 may comprise at least one processor 1310. The apparatus 1300 may further comprise a memory 1320 connected with the at least one processor 1310. The memory 1320 may store computer-executable instructions that, when executed, cause the at least one processor 1310 to: generate a set of utterance texts including a given keyword; synthesize a set of speech signals corresponding to the set of utterance texts; and optimize an acoustic model in the keyword spotting system with at least a part of speech signals in the set of speech signals and utterance texts in the set of utterance texts corresponding to the at least a part of speech signals.

The embodiments of the present disclosure may be embodied in a non-transitory computer-readable medium. The non-transitory computer-readable medium may comprise instructions that, when executed, cause one or more processors to perform any operations for optimizing the keyword spotting system according to the embodiments of the present disclosure as mentioned above.

It should be appreciated that all the operations in the methods described above are merely exemplary, and the present disclosure is not limited to any operations in the methods or sequence of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally segmented into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The above description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for optimizing a keyword spotting system, comprising:
   generating a set of utterance texts including a given keyword, wherein the generating a set of utterance texts including a given keyword comprises:
      searching at least one reference keyword semantically related to the given keyword from a group of reference utterance texts;
      extracting one or more reference utterance texts including the at least one reference keyword from the group of reference utterance texts; and
      replacing the at least one reference keyword in the extracted one or more reference utterance texts with the given keyword to generate one or more utterance texts in the set of utterance texts;
   synthesizing a set of speech signals corresponding to the set of utterance texts; and
   optimizing an acoustic model in the keyword spotting system with at least one part of speech signals in the set of speech signals and utterance texts in the set of utterance texts corresponding to the at least one part of speech signals.

2. The method of claim 1, wherein the generating a set of utterance texts including a given keyword comprises:
concatenating the given keyword and a group of reference utterance texts.

3. The method of claim 2, wherein the concatenating the given keyword and a group of reference utterance texts comprises at least one of:
placing the given keyword in front of one or more reference utterance texts in the group of reference utterance texts respectively;
placing the given keyword between any two reference utterance texts in the group of reference utterance texts respectively; and
placing the given keyword behind one or more reference utterance texts in the group of reference utterance texts respectively.

4. The method of claim 1, further comprising:
performing a signal transformation on at least one speech signal in the set of speech signals.

5. The method of claim 4, wherein the signal transformation comprises at least one of:
adding background noise;
performing speed perturbation; and
applying room impulse response.

6. The method of claim 1, wherein a loss function for optimizing the acoustic model is based on Kullback-Leibler (KL) divergence.

7. The method of claim 1, further comprising:
adjusting a confidence threshold corresponding to the given keyword to satisfy performance indexes of the keyword spotting system.

8. The method of claim 7, wherein the adjusting a confidence threshold comprises:
performing keyword spotting by the keyword spotting system on a dataset including the given keyword and a dataset not including the given keyword, the dataset including the given keyword comprising at least another part of speech signals in the set of speech signals; and
adjusting the confidence threshold based at least on a result of the keyword spotting and the performance indexes.

9. The method of claim 7, wherein the performance indexes of the keyword spotting system comprises a metric of correct accept and a metric of false accept for the given keyword.

10. The method of claim 1, wherein the synthesizing a set of speech signals corresponding to the set of utterance texts comprises:
for each utterance text in the set of utterance texts, synthesizing a plurality of speech signals in voices of different speakers.

11. A method for optimizing a keyword spotting system, comprising:
generating a set of utterance texts including a given keyword, wherein the generating a set of utterance texts including a given keyword comprises:
segmenting the given keyword into a plurality of sub-keywords;
obtaining a plurality of reference words semantically related to the plurality of sub-keywords respectively;
combining the plurality of sub-keywords and the plurality of reference words into at least one reference keyword;
searching the at least one reference keyword from a group of reference utterance texts;
extracting one or more reference utterance texts including the at least one reference keyword from the group of reference utterance texts; and
replacing the at least one reference keyword in the extracted one or more reference utterance texts with the given keyword to generate one or more utterance texts in the set of utterance texts;
synthesizing a set of speech signals corresponding to the set of utterance texts; and
optimizing an acoustic model in the keyword spotting system with at least one part of speech signals in the set of speech signals and utterance texts in the set of utterance texts corresponding to the at least one part of speech signals.

12. The method of anyone of claim 11, further comprising:
selecting one or more utterance texts for synthesizing the set of speech signals from the set of utterance texts through performing filtering by a language model.

13. An apparatus for optimizing a keyword spotting system, comprising:
at least one processor; and
a memory storing computer-executable instructions that, when executed, cause the at least one processor to operate:
an utterance text generating module, for generating a set of utterance texts including a given keyword, wherein the generating a set of utterance texts including a given keyword comprises:
searching at least one reference keyword semantically related to the given keyword from a group of reference utterance texts;
extracting one or more reference utterance texts including the at least one reference keyword from the group of reference utterance texts; and
replacing the at least one reference keyword in the extracted one or more reference utterance texts with the given keyword to generate one or more utterance texts in the set of utterance texts;
a speech signal synthesizing module, for synthesizing a set of speech signals corresponding to the set of utterance texts; and
an acoustic model optimizing module, for optimizing an acoustic model in the keyword spotting system with at least one part of speech signals in the set of speech signals and utterance texts in the set of utterance texts corresponding to the at least one part of speech signals.

14. An apparatus for optimizing a keyword spotting system, comprising:
at least one processor; and
a memory storing computer-executable instructions that, when executed, cause the at least one processor to:
generate a set of utterance texts including a given keyword, wherein the generating a set of utterance texts including a given keyword comprises:
segmenting the given keyword into a plurality of sub-keywords;
obtaining a plurality of reference words semantically related to the plurality of sub-keywords respectively;
combining the plurality of sub-keywords and the plurality of reference words into at least one reference keyword;
searching the at least one reference keyword from a group of reference utterance texts;
extracting one or more reference utterance texts including the at least one reference keyword from the group of reference utterance texts; and replacing the at least one reference keyword in the extracted one or more reference utterance texts with the given keyword to generate one or more utterance texts in the set of utterance texts;
synthesize a set of speech signals corresponding to the set of utterance texts; and
optimize an acoustic model in the keyword spotting system with at least one part of speech signals in the set of speech signals and utterance texts in the set of utterance texts corresponding to the at least one part of speech signals.

* * * * *